Figure 1:
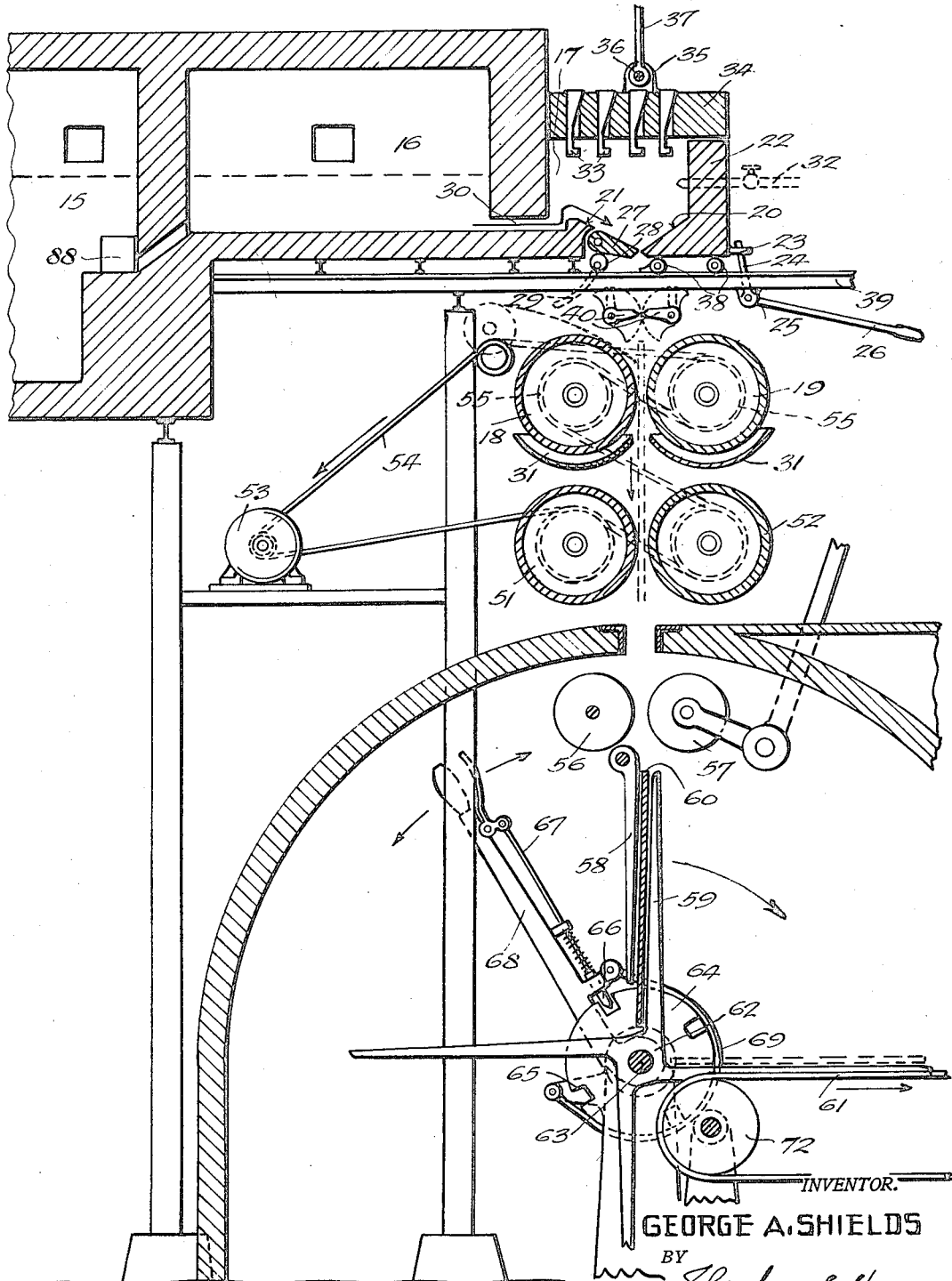

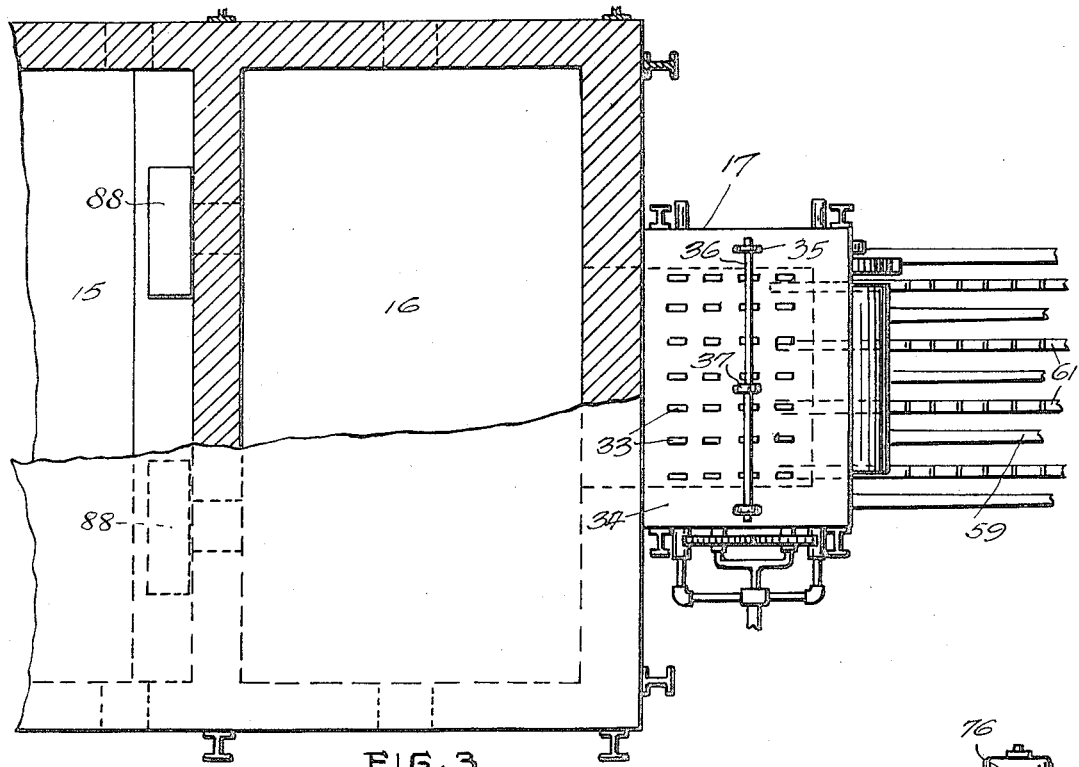
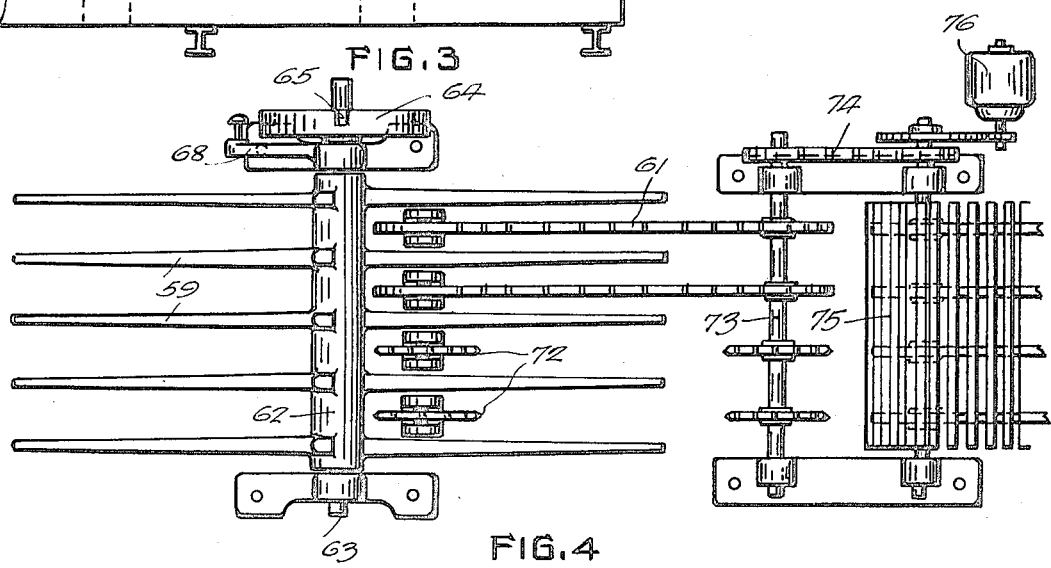

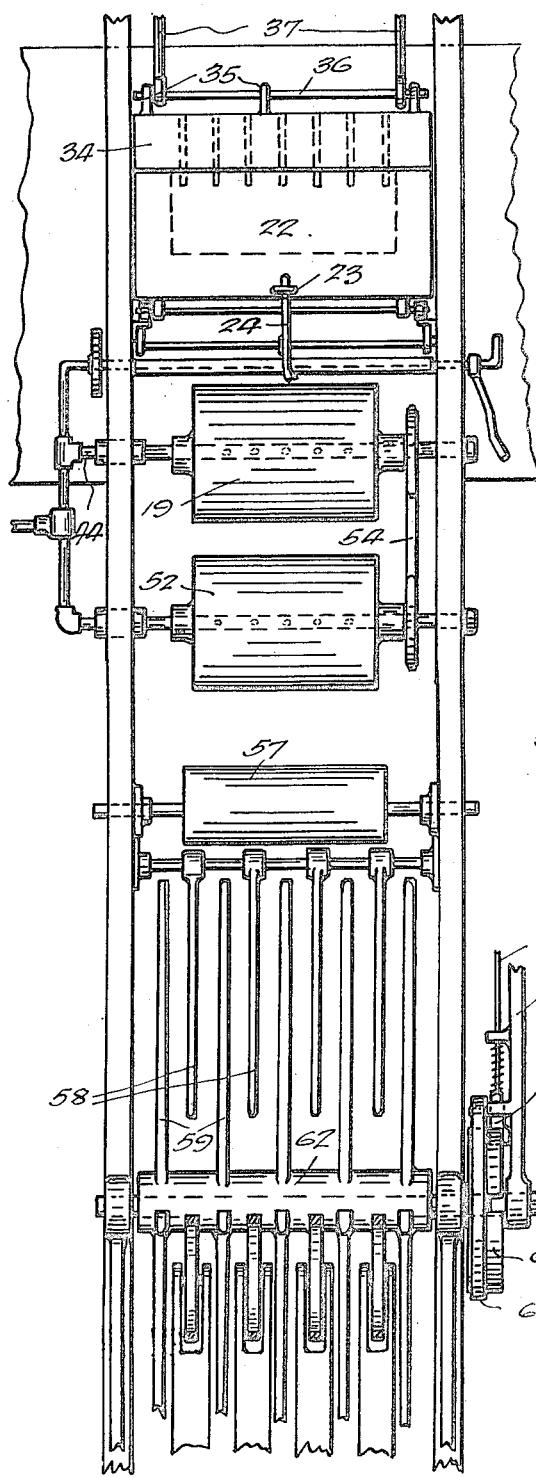
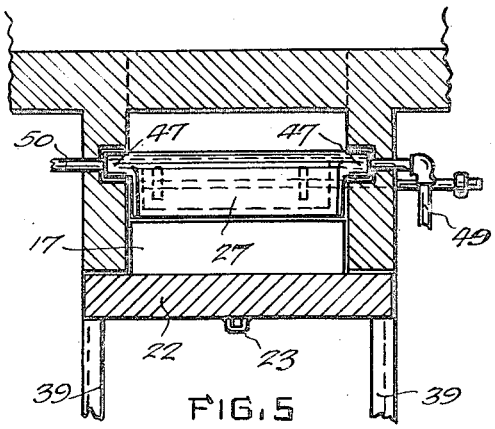
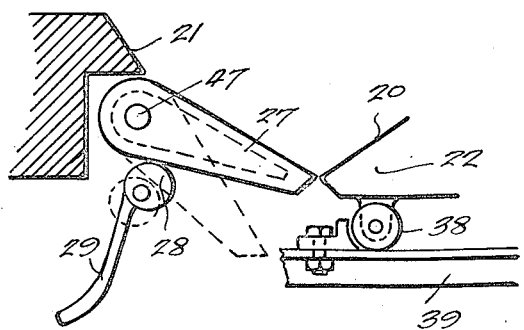
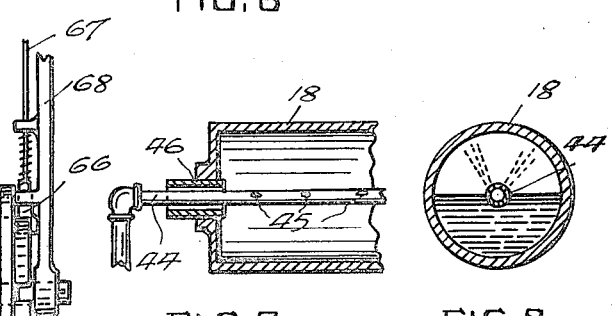
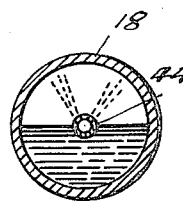

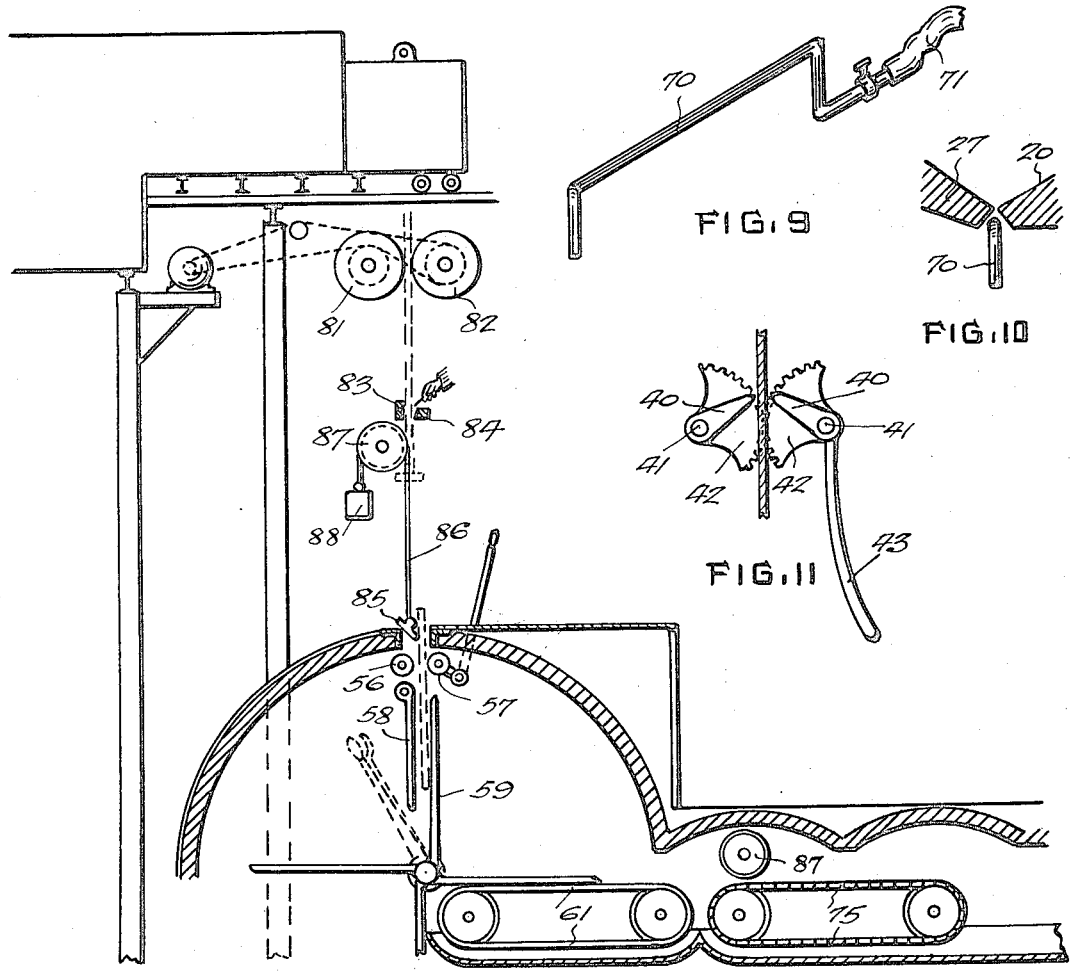
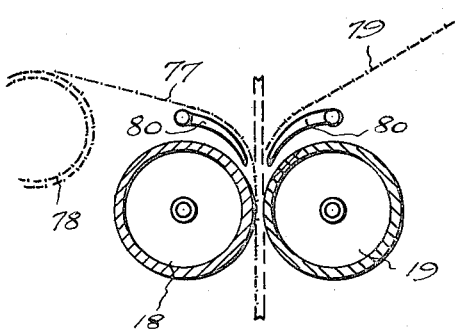

Patented Jan. 1, 1924.

1,479,206

UNITED STATES PATENT OFFICE.

GEORGE A. SHIELDS, OF COLUMBUS, OHIO.

GLASS MACHINE.

Application filed April 13, 1921. Serial No. 460,931.

*To all whom it may concern:*

Be it known that I, GEORGE A. SHIELDS, a citizen of the United States of America, residing at Columbus, in the county of Franklin and State of Ohio, have invented certain new and useful Improvements in Glass Machines, of which the following is a specification.

My present invention relates generally to glass machines, and particularly to a machine for rolling flat glass such as window glass, wire glass, florentine, rough rolled, factory, bordered, and other flat glass with or without surface designs or ornamentations.

The primary object of my invention is the provision of a simple practical machine whereby a wide range of variation may be had as to product, in respect to thickness, character and the like depending upon the particular uses to which the product is to be put.

A still further object is the provision of a machine which may be readily started without unnecessary waste, easily operated and controlled, quickly adjusted and effectively used with minimum breakage of glass.

These and further objects as well as the resulting advantages of my invention will appear in the course of the following description, reference being made to the accompanying drawings, which form a part of this specification, and in which, Figure 1 is a vertical longitudinal section through my improved machine, Figure 2 is a front view, Figure 3 is a top plan view partly broken away and in section, Figure 4 is a top plan view of the conveyor, Figure 5 is a horizontal section through the flowing chamber, Figure 6 is a vertical section through a portion of the base of said chamber, Figure 7 is a partial longitudinal section through one of the pressure rolls, Figure 8 is a transverse section therethrough, Figure 9 is a detail perspective view of the starting or leading device, Figure 10 is a section showing the device of Figure 9 in effective position, Figure 11 is a side view of the cutters of Figure 1, Figure 12 is a detail section through a pair of pressure rolls showing the manner of forming wire glass, and, Figure 13 is a sectional side view of a slightly modified arrangement adapted particularly to the forming of transparent window glass.

Referring now to these figures and particularly to Figure 1, I have shown at 15 a melting chamber which feeds molten glass into a refining chamber 16, the latter in turn feeding into a flowing chamber 17 having a glass discharge aperture at its base above parallel spaced rolls 18 and 19.

In order to regulate the flow of glass through the lower slot-like discharge of the flowing chamber base, the latter has oppositely inclined portions 20 and 21, the former of which is carried by a horizontally adjustable wall section 22 provided with an exteriorly projecting eye or the like, 23. This eye 23 is penetrated by one upper end 24 of an adjusting bell-crank 25, whose opposite end 26 forms a handle. By raising and lowering handle 26 the wall section 22 will be respectively shifted inwardly and outwardly.

In the other inclined portion 21 a pivoted vertically swinging discharge door 27 is mounted, whose inner edge can be shifted upwardly and downwardly with respect to the horizontally adjustable portion 20, so that the inner edge of the latter and that of the door 27 cooperate to define a readily adjustable glass discharge slot capable of a wide range of adjustment between the formation of thin window glass and thick glass brick. The door 27 rests on, and is adjusted by, a cam 28 having a shifting handle 29 and the inclined portion 21 of which the door 27 is a part is nearest the feed passage 30 between the refining chamber 16 and the flowing chamber 17.

In operation, the refining chamber 16 acts to reduce the high heat of the glass from the melting chamber 15 to a readily workable state, while in the flowing chamber 17 the glass is maintained at an even uniform temperature either by gaseous burners, of which one is shown in dotted lines at 32 in Figure 1, or by suitable electric heating elements (not shown) adapted to be supported by fire-clay supports 33 depending from the removable top 34 of the flowing chamber 17. This removable top 34 has upstanding lugs 35 supporting a cross rod 36 which carries a handle 37 for lifting and removing the top 34 when desirable or necessary.

The horizontally adjustable wall section 22 preferably travels by means of rollers 38, upon tracks 39, beneath the latter of which and below the discharge slot of the flowing chamber 17 a cutting device may be mounted for ordinary purposes such as the manufacture of florentine, factory glass and the like. This cutting device located above the flattening or shaping rolls 18 and 19 as seen in Figure 1, may consist of a pair of swinging coacting knives 40 mounted on shafts 41 as in Figure 11 and are simultaneously shiftable by virtue of arcuate gears 42 and a lever 43 connected to one of the shafts.

The rolls 18 and 19 preferably travel in paste or lubricant holding troughs 31 which prevent adhesion of molten glass thereto and are also preferably hollow cylinders as seen in Figures 7 and 8, rotatably mounted on a liquid feed pipe 44 having apertures 45 within the cylinders through which cooling fluid is discharged into the same. This cooling fluid stands to the level of the feed pipe and escapes through the bearings 46 of the cylinder on the journal and feed pipe. In a similar manner the molten glass discharge door 27 may be hollow as in Figure 5, with trunnions at 47 journaled in the side walls 48 of the flowing chamber 17 and receiving cooling fluid in one trunnion through a feed pipe 49 and discharging from its other trunnion through a discharge pipe 50.

As above stated, the mechanical cutters 40 are utilized in connection with certain products with which a second pair of pressure rolls 51 and 52 may and preferably will be employed, located below the rolls 18 and 19 and selectively spaced with or without surface designs or ornamentations. Pressure rolls 18 and 19 and the rolls 51 and 52 as used in Figure 1 are preferably driven in synchronism from a single motor 53 through a belt 54 around pulleys 55 of the several rolls, and the rolls 51 and 52 may be hollow and cooled by an arrangement similar to that described in connection with the roll 18 of Figures 7 and 8.

Thus the film or sheet of molten glass in a properly workable state passes downwardly from the flowing chamber 17 through the rolls 18 and 19 and subsequently between the rolls 51 and 52 and is cut off into sheets by actuation of the cutters 40. Each sheet descending from the rolls 51 and 52 as in Figure 1, passes downwardly between idle guide rollers 56 and 57 and drops into the space between guide forks 58 and the adjacent arms of a revolving reel 59 so that upon revolution of the latter the sheet, seen at 60 in Figure 1 is shifted forwardly onto the rear end of a horizontal conveyor or conveyors 61 by which it is transferred to the usual annealing furnace.

The reel 59 has a hub 62 on a shaft 63 upon which a disk 64 is secured, and this disk is provided with a series of peripheral notches 65 each adapted to receive the latch 66 of a latch mechanism 67 on a hand lever 68. This lever is loosely rotatable on shaft 63 and has attached thereto one end of a brake band 69 partially surrounding the disk 64. Thus when a sheet 60 drops to position in front of the guide forks 58 as in full lines in Figure 1 the operator grasps the lever 68 and before releasing the latch 66, shifts the lever forwardly to a sufficient extent so that after releasing the latch the weight of the sheet 60 will serve to continue the movement until the sheet rests on the conveyor 61. During this latter portion of the movement, the operator, by shifting the lever 68 rearwardly, can effectively control the moving parts through the brake band 69 and disk 64.

In starting operations, the initial flow of glass from the chamber 17 is effected and controlled by a leading tube 70 seen in Figure 9 and in effective position in Figure 10, which is of inverted U-shape with a flexible pipe 71 attached to one end. This tube 70, heated in the first instance is disposed immediately below the glass outlet slot between the door 27 and the adjacent edge of the adjustable wall section, so as to receive glass thereon when the door is opened. Owing to its heated condition the glass adheres to the tube 70 and the latter is then moved downwardly between the rolls 18 and 19 and then cooled by cooling fluid supplied thereto through pipe 71 so that it can be released from the sheet of glass and the latter permitted to move downwardly as usual. Where rolls 51 and 52 are employed the tube is of course moved downwardly to guide the sheet between these rolls before release as above.

By reference to Figure 4 it will be noted that conveyor 61 consists of a series of parallel spaced belts or chains mounted at their rear ends around spaced rollers or sprocket wheels 72 so that the arms of the reel 59 can pass between them. These conveyor chains or belts may extend at their forward ends around pulleys or sprocket wheels on a common shaft 73 and this shaft may be connected by a chain or belt 74 to the rear shaft of a second slat conveyor 75 so that both conveyors may be driven from a single motor 76.

In the formation of wire glass, wire 77 may be supplied to the downwardly moving sheet of glass either from a wire roll 78 or in sheets 79 as in Figure 12. The rolls 18 and 19 in this instance operate to press the wire into the glass sheet and the wire to either side of the glass passes downwardly between the rolls over a stationary guide arm 80 placed slightly above the respective pressure roll.

In the formation of window glass the same operation, as heretofore described, is carried out except that but a single pair of pressure rolls 81 and 82 are utilized and the cutters 40 are dispensed with. Rolls 81 and 82 are preferably covered with asbestos or other suitable material and below these rolls, the glass passes between the guides 83, 84 adjacent to which it is preferably cut for instance by a hand cutter and the severed sheet falls onto a small elevator block 85 attached to swing at the lower end of a flexible connection 86 which passes over a guide pulley 87 and has a counter balance weight 88 normally holding the block in its upper position. This block serves to lower the severed sheet and tilts at the lower end of its movement so as to release the sheet and permit the latter to fall into the reel 59.

In Figure 13, above conveyor 75 I have shown a loose running roller 87 which is preferably water-cooled like the rollers 18 and 19 and asbestos covered, its function being to flatten any glass sheets which at this point are getting cool and sometimes warp and bulge. It is obvious from an inspection of this figure and Figures 1 and 2 that window glass of all kinds as well as auto lenses may be formed as well as glass marked by ridges or edges paralleling or circumscribing the rolls 51 and 52. In Figure 1 furthermore I have shown a block 88 in the melting tank 15 controlling the opening into the refining chamber 16 in which a similar block may be used to control the opening 30 into the drawing chamber 17.

It is thus obvious the machine I propose is capable of ready adjustment for various uses in so far as the desired product is concerned, and may be effectively utilized for the formation of various characters of glass in sheets, including articles such as automobile lens formed in multiple and subsequently broken apart.

It is also obvious the invention permits of ready, easy operation and control during operation as well as starting and that my improved machine is simple strong and durable, comparatively inexpensive and eliminates the necessity of specially trained and skillful operatives.

I claim:

1. In a glass machine, a transfer reel, a lever for holding and actuating the reel having latch controlled connection therewith at spaced points therearound, and a brake carried and actuated by the said lever for controlling the reel during its said rotation between said points.

2. In a glass machine, a transfer reel, a shaft on which the reel is mounted having a peripherally notched disk, a lever loosely mounted on the shaft and having a latch mechanism for cooperation with the notches of the disk, and a brake band engaging the said disk and connected to and controlled by the said lever.

3. In a glass machine, a glass feeding device including a flowing chamber having an inclined base downwardly upon which the glass moves, and a pivoted vertically swinging door over the free edge of which the glass discharges downwardly from the chamber as described.

4. In a glass machine, a glass feeding device including a flowing chamber having a pivoted vertically swinging discharge door in its base and having a portion with which the free edge of the door cooperates to control the outflow of glass from the chamber.

5. In a glass machine, a glass feeding device including a flowing chamber having a pivoted vertically swinging discharge door in its base and having a portion with which the free edge of the door cooperates to control the outflow of glass from the chamber, said last named portion being adjustable toward and away from the free edge of the door as described.

6. In a glass machine, a glass feeding device including a flowing chamber having a pivoted vertically swinging discharge door in its base, and an adjustable section having a lower free edge cooperating with and shiftable toward and away from the free edge of the said door.

7. In a glass machine, a glass feeding device including a flowing chamber having a pivoted vertically swinging discharge door in its base, and an adjustable section having a lower free edge cooperating with and shiftable toward and away from the free edge of the said door, means for independently adjusting the door and the adjustable section as described.

8. In a glass machine, a glass feeding device having a downwardly opening glass feed aperture, and a starting device consisting of a leading tube movable vertically beneath the discharge aperture, having a flexible pipe connected thereto whereby to permit of its vertical movement and the feed of cooling fluid to the tube as and for the purpose set forth.

9. In a glass machine, having a melting chamber and a refining chamber in communication with the melting chamber, means forming a flowing chamber in communication with the refining chamber, having a vertically adjustable door in its base and a portion shiftable toward and away from the door, with which the latter cooperates to form a slot-like discharge opening of selected width.

10. In a glass machine, means for feeding molten glass in a sheet, and a cutting off device including a pair of swinging cutters between which the sheet of glass passes, having cooperating free edges, geared connections between the said cutters, and a lever for actuating the cutters.

11. In a glass machine, a glass feeding device including a flowing chamber having a pivoted vertically swinging discharge door in its base of hollow form, and means for feeding fluid into the hollow of the door as described.

12. In a glass machine including a flowing chamber having means to control the flow of molten glass therefrom, a removable cover for said chamber having depending hooks formed of fire-resistant material and adapted to support heating means to maintain a uniform temperature within the chamber.

In testimony whereof I have affixed my signature.

GEORGE A. SHIELDS.